(12) United States Patent
Iwamiya et al.

(10) Patent No.: US 8,090,582 B2
(45) Date of Patent: Jan. 3, 2012

(54) VOICE RECOGNITION APPARATUS

(75) Inventors: Ryo Iwamiya, Tokyo (JP); Reiko Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 932 days.

(21) Appl. No.: 12/083,609

(22) PCT Filed: Sep. 13, 2006

(86) PCT No.: PCT/JP2006/318182
§ 371 (c)(1),
(2), (4) Date: Apr. 15, 2008

(87) PCT Pub. No.: WO2007/069377
PCT Pub. Date: Jun. 21, 2007

(65) Prior Publication Data
US 2009/0222265 A1 Sep. 3, 2009

(30) Foreign Application Priority Data

Dec. 14, 2005 (JP) .................................. 2005-360816

(51) Int. Cl.
*G10L 15/04* (2006.01)
*G10L 15/20* (2006.01)
(52) U.S. Cl. ........................................ 704/253; 704/233
(58) Field of Classification Search .................. None
See application file for complete search history.

(56) References Cited

U.S. PATENT DOCUMENTS

| 5,848,388 | A | * | 12/1998 | Power et al. ................ 704/239 |
| 6,701,292 | B1 | * | 3/2004 | Kawai et al. ................ 704/238 |
| 7,038,596 | B2 | * | 5/2006 | Nakajima .................... 340/905 |
| 7,103,542 | B2 | * | 9/2006 | Doyle ............................ 704/231 |
| 2003/0023432 | A1 | | 1/2003 | Kyomitsu | |
| 2004/0128137 | A1 | | 7/2004 | Bush et al. | |
| 2008/0004881 | A1 | * | 1/2008 | Attwater et al. ............. 704/275 |

FOREIGN PATENT DOCUMENTS

| CN | 1573730 A | 2/2005 |
| JP | 57-30913 A | 2/1982 |
| JP | 58-50598 A | 3/1983 |
| JP | 2002-91489 A | 3/2002 |
| JP | 2004-37910 A | 2/2004 |
| JP | 2004-94077 A | 3/2004 |
| JP | 2004-212533 A | 7/2004 |
| JP | 2004-348657 A | 12/2004 |
| JP | 2006-251545 A | 9/2006 |

* cited by examiner

*Primary Examiner* — Brian Albertalli
(74) *Attorney, Agent, or Firm* — Birch, Stewart, Kolasch & Birch, LLP

(57) ABSTRACT

A voice recognition apparatus 10 includes a voice recognition means 12 for performing voice recognition, and a control means for controlling receipt of a voice input to the voice recognition means, and for performing recognition according to a result of the voice recognition acquired by the voice recognition means. In this voice recognition apparatus, the control means controls the receipt of a voice according to a timeout time which defines the end of the receipt of a voice. The voice recognition apparatus further includes an environmental condition detecting means 18 for detecting an environmental condition, and a timeout time control means 16 for changing the timeout time according to the environmental condition detected by the environmental condition detection means.

14 Claims, 8 Drawing Sheets

| Item Number | Condition | T1(ms) | T2(ms) | T3(ms) | Autorestart |
|---|---|---|---|---|---|
| 1 | Current Position Is Close to Destination | 3000 | 7000 | 600 | OFF |
| 2 | Velocity Is Less than 60km/h | 5000 | 8000 | 500 | ON |
| 3 | Velocity Is Equal to or Greater than 60km/h | 2000 | 5000 | 300 | OFF |
| 4 | Road Type Is Minor Street | 4000 | 9000 | 400 | ON |
| 5 | Area Type Is Residential Area | 5000 | 10000 | 500 | ON |
| ⋮ | ⋮ | ⋮ | ⋮ | ⋮ | ⋮ |
| 100 | Two or More of Conditions 1 to 99 Are Satisfied Simultaneously | 3000 (Default) | 8000 (Default) | 500 (Default) | OFF (Default) |

FIG. 9

| Item Number | Dialog Content | Degree of Difficulty in Dialog (Score) |
|---|---|---|
| 1 | Are you are male or female? | 10 |
| 2 | What is your name? | 10 |
| 3 | What month and what day is it today? | 20 |
| 4 | What would you like to eat tonight? | 40 |
| ⋮ | ⋮ | ⋮ |

VOICE RECOGNITION APPARATUS

FIELD OF THE INVENTION

The present invention relates to a voice recognition apparatus which recognizes an inputted voice and outputs recognition according to the recognition result. More particularly, it relates to a voice recognition apparatus mounted in a moving object, such as a vehicle, for providing a guidance according to an inputted voice.

BACKGROUND OF THE INVENTION

In general, a voice recognition apparatus which recognizes an inputted voice and performs recognition according to a result of the recognition is known. For example, there has been provided a voice recognition apparatus which is mounted in a moving object, such as a vehicle, and which is constructed in such a way as to provide guidance for a driver according to an inputted voice in order to avoid the danger resulting from the driver's manipulation of a button. This type of voice recognition apparatus is equipped with a voice recognition unit which recognizes an inputted voice, and the voice recognition unit needs to discriminate between the inputted voice and disturbance, such as noise, in order to recognize the inputted voice.

Furthermore, there has been provided a voice recognition apparatus which is constructed in such a way as to, when performing voice recognition, time out if the user does not utter any sound even after a predetermined time (i.e., a timeout time) elapses. In such a voice recognition apparatus, when, for example, the user performs a voice input according to an utterance urging signal from the voice recognition apparatus, taking into consideration the fact that, generally, the time required for the user to utter the first one word after the user hears the utterance urging signal is longer than that required for the user to utter further words after that, in most cases, it takes much time for the user to utter the first one word and a timeout therefore occurs before the user utters the first one word.

To solve this problem, conventionally, there has been provided a voice recognition apparatus intended for vehicles which automatically adjusts a discrimination reference level used for discrimination between noise and voice according to the traveling conditions of the vehicle, such the velocity and the gear position of the vehicle, so as to surely discriminate between the inputted voice and noise (surely recognize the inputted voice) throughout the vehicle's velocity range from a low velocity to a high velocity (for example, refer to patent reference 1).

In addition, there has been provided a voice recognition apparatus which is constructed in such a way as to make timeout times variable in order to prevent a timeout from occurring before the user utters the first one word, particularly to lengthen a timeout time which defines a time interval during which the user has to utter the first one word (for example, refer to patent reference 2).

[Patent reference 1] JP, 57-30913,A (see pp. 2 to 3 and FIGS. 3 and 4)

[Patent reference 2] JP, 58-50598,A (see pp. 2 and FIGS. 1 and 2)

DISCLOSURE OF THE INVENTION

Conventional voice recognition apparatuses are constructed as mentioned above. Therefore, a problem with the invention disclosed by patent reference 1 is that because the voice recognition apparatus of this reference only adjusts the discrimination reference level used for discrimination between noise and voice according to the traveling conditions of the vehicle, it does not carry out any timeout process and therefore the probability that noise and voice are inputted simultaneously becomes very high when it takes much time for the user to perform a voice input, and therefore, even if the discrimination reference level used for discrimination between noise and voice is adjusted, it becomes difficult to discriminate between noise and voice with a high degree of precision and the voice recognition rate degrades.

On the other hand, a problem with the invention disclosed by patent reference 2 is that when the timeout time which defines a time interval during which the user has to utter the first one word is lengthened, a time period during which noise and voice can be simultaneously inputted to the voice recognition apparatus becomes long by the increase in the timeout time, the voice recognition apparatus cannot recognize the inputted voice correctly, for example, under noise environments.

The present invention is made in order to solve the above-mentioned problems, and it is therefore an object of the present invention to provide a voice recognition apparatus which can always recognize an inputted voice with a high degree of precision.

A voice recognition apparatus in accordance with the present invention includes: a voice recognition means for performing voice recognition; and a control means for controlling receipt of a voice input to the voice recognition means according to a timeout time which defines an end of the receipt of a voice input, and for performing recognition according to a result of the voice recognition acquired by the voice recognition means. Furthermore, this voice recognition apparatus is characterized in that the control means controls the receipt of a voice according to a timeout time which defines the end of the receipt of a voice, and the voice recognition apparatus further includes an environmental condition detecting means for detecting an environmental condition, and a timeout time control means for changing the timeout time according to the environmental condition detected by the environmental condition detection means.

Because the voice recognition apparatus according to the present invention is thus constructed in such a way as to change the timeout time on the basis of the environmental condition, there is provided an advantage of being able to set up a proper timeout time according to the environmental condition at all times, to reduce the probability resulting in erroneous recognition, and to always recognize an inputted voice with a high degree of precision.

BRIEF DESCRIPTION OF THE FIGURES

FIG. 9 is a diagram showing an example of a degree-of-difficulty-in-dialog table for use in the voice recognition apparatus shown in FIG. 7.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
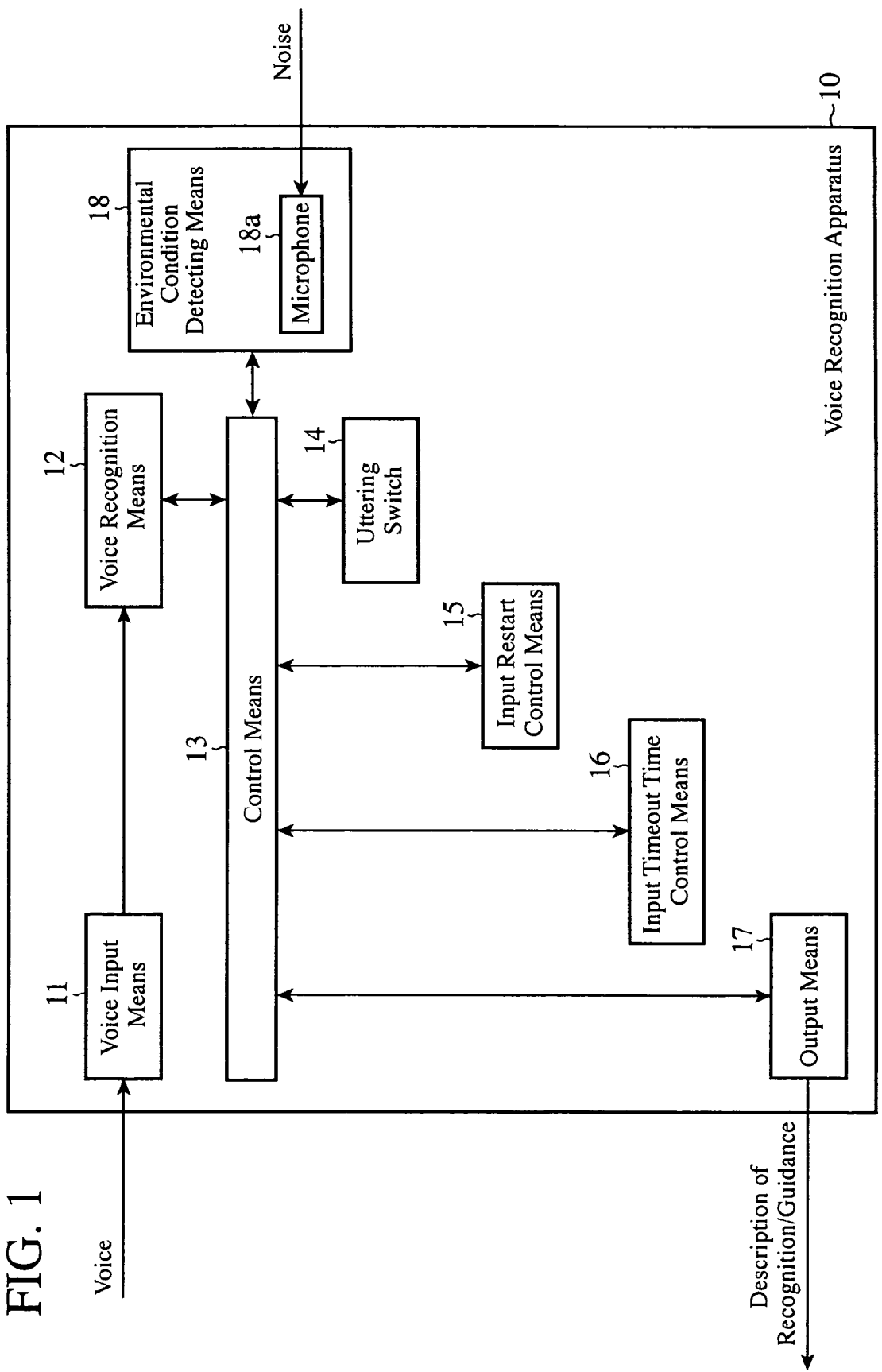
FIG. 1 is a block diagram showing an example of a voice recognition apparatus in accordance with Embodiment 1 of the present invention.

FIG. 1 is a block diagram showing an example of a voice recognition apparatus in accordance with Embodiment 1 of the present invention, and the illustrated voice recognition apparatus 10 is mounted in a moving object, such as a vehicle. The voice recognition apparatus 10 has a voice input means 11, such as a microphone, a voice recognition means 12, a control means 13, an uttering switch 14, an input restart control means 15, an input timeout time control means 16, an output means 17, and an environmental condition detecting means 18. In the environmental condition detecting means 18, for example, a microphone 18a is disposed.

When a user uses the voice recognition apparatus 10, he or she turns on the uttering switch 14 (he or she presses down this switch). Thereby, the control means 13 makes the voice recognition means 12 enter a state in which the voice recognition means 12 can operate (i.e., a state in which the voice recognition means can receive a voice input). When the user inputs a voice from the voice input means 11, the voice recognition means 12 recognizes the inputted voice and provides a recognition result to the control means 13. The control means 13 provides the recognition result, as the description of the recognition, to the output means 17, and also provides recognition (e.g., guidance or the like) according to the recognition result to the output means 17. The output means 17 outputs the description of the recognition/guidance.

In the illustrated voice recognition apparatus 10, the environmental condition detecting means 18 extracts, as ambient noise, noise in a surrounding environment, and provides this ambient noise to the control means 13. As will be mentioned later, the input timeout time control means 16 adjusts a timeout time to stop the receipt of a voice input according to the ambient noise. The input restart control means 15 controls whether to restart the receipt of a voice input-according to the ambient noise after the voice input times out, as will be mentioned later.

Figures 2, 6:
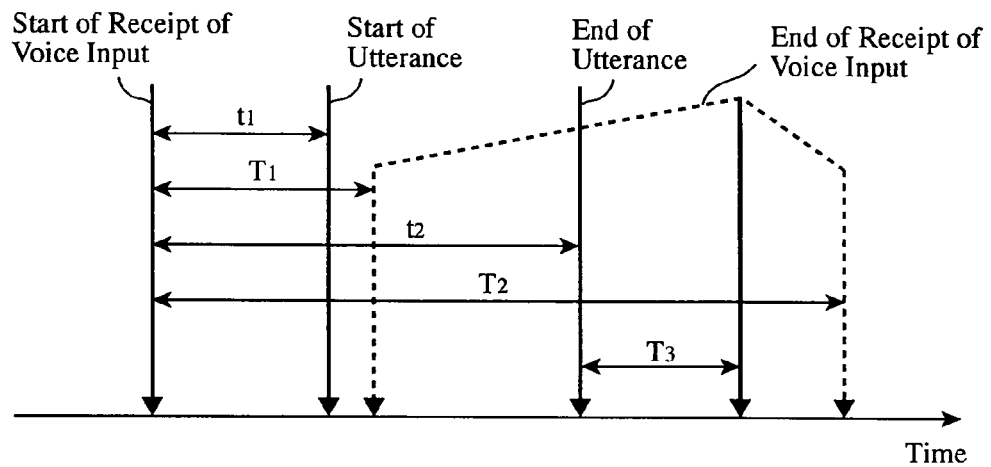
FIG. 2 is a diagram for explaining first through third timeout times for use in the voice recognition apparatus shown in FIG. 1.
FIG. 6 is a diagram showing an example of a decision table for use in the voice recognition apparatus shown in FIG. 4.

Explaining now the above-mentioned timeout time, as shown in FIG. 2, the timeout time includes first through third timeout times T1 to T3. The first timeout time T1 is a time which defines a time interval from the start of the receipt of a voice input to the start of an utterance. Similarly, the second timeout time T2 is a time which defines a time interval from the start of the receipt of a voice input to the end of the utterance, and the following relation: T1<T2 is established. The third timeout time T3 is a time which defines a time interval succeeding the end of the user's utterance. When the third timeout time T3 elapses, the control means 13 ends the receipt of a voice input.

When a time t1 from the start of the receipt of a voice input to the start of an utterance exceeds the first timeout time T1, the control means 13 ends the receipt of the voice input, and, when a time t2 from the start of the receipt of the voice input to the end of the utterance exceeds the second timeout time T2, the control means 13 also ends the receipt of the voice input.

Next, the operation of the voice recognition apparatus will be explained.

Figure 3:
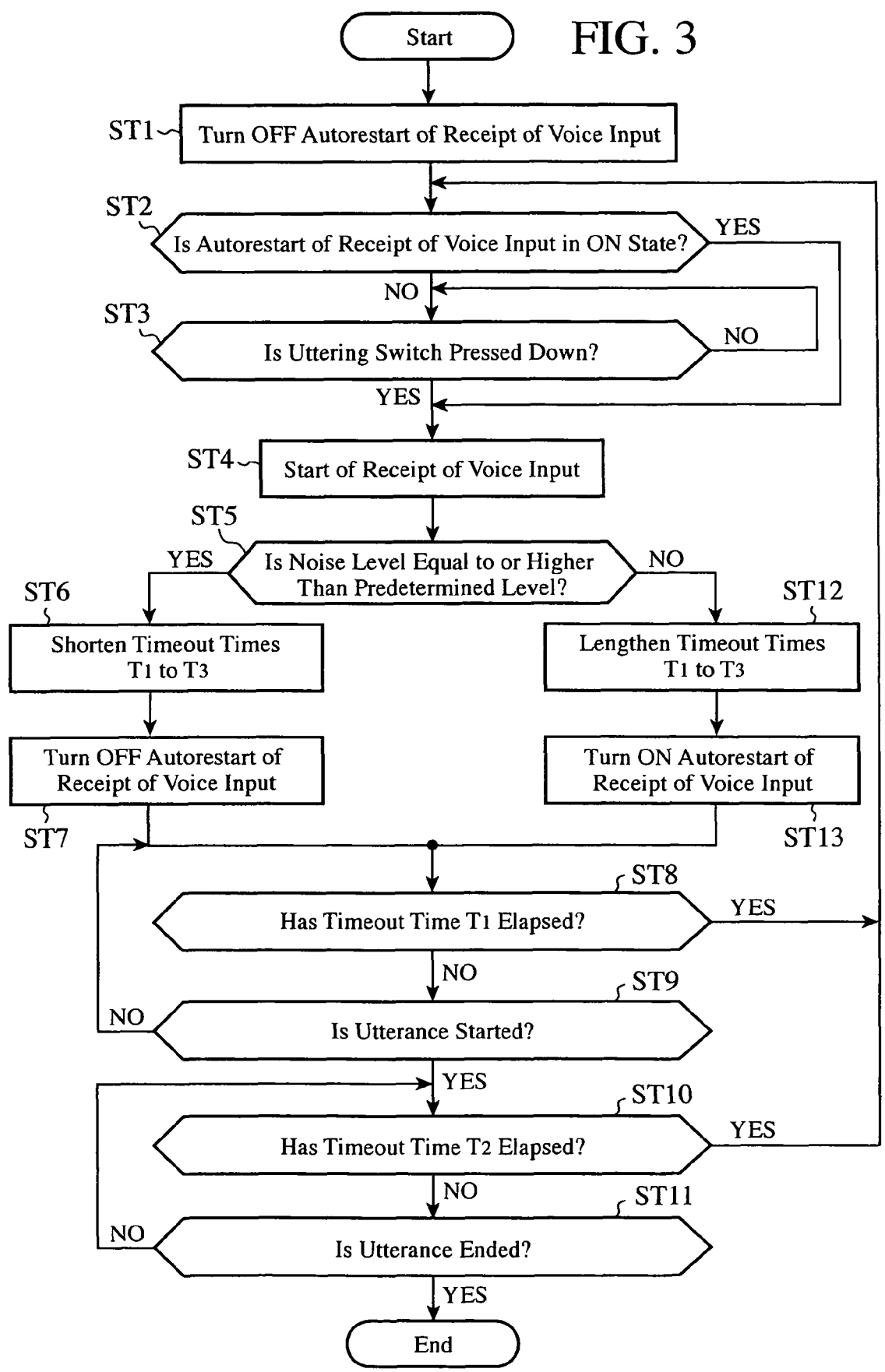
FIG. 3 is a flow chart for explaining the operation of the voice recognition apparatus shown in FIG. 1.

Referring to FIGS. 1 to 3, when the voice recognition apparatus 10 is turned on (ON), the control means 13 turns off (OFF) the autorestart of the receipt of a voice input (i.e., turns off the input restart control means 15 (an initial state: step ST1)), and then determines whether or not the autorestart of the receipt of a voice input is turned on (step ST2). At this time, because the input restart control means 15 is placed in the OFF state, the control means 13 then determines whether or not the uttering switch 14 is pressed down (step ST3), and stands by until the uttering switch 14 is pressed down. When the uttering switch 14 is pressed down, the receipt of a voice input is started by the control means 13 (step ST4).

The ambient noise is provided from the environmental condition detecting means 18 to the control means 13, and the input timeout time control means 16 determines whether or not the level of the ambient noise (i.e., the noise level) is equal to or higher than a predetermined level under the control of the control means 13 (step ST5). When the noise level is equal to or higher than the predetermined level, the input timeout time control means 16 judges that the inputted voice is easily influenced by the ambient noise, i.e., the recognition rate degrades, and shortens the first through third timeout times T1 to T3 from first through third predetermined times by first through third time lengths which are defined in advance, respectively (step ST6). When the first through third timeout times T1 to T3 are shortened, the control means 13 holds the autorestart of the voice input receipt in the OFF state (step ST7).

Next, the input timeout time control means 16 determines whether the first timeout time T1 has elapsed since the receipt of a voice input was started (step ST8). When the input timeout time control means 16 determines that the first timeout time T1 has elapsed since the receipt of a voice input was started, the control means 13 ends the receipt of a voice input and returns to step ST2. In contrast, when the input timeout time control means determines that the first timeout time T1 has not elapsed since the receipt of a voice input was started, the control means 13 determines whether or not an utterance is started, and, when no utterance is started, returns to step ST8.

When an utterance is started, the input timeout time control means 16 determines whether the second timeout time T2 has elapsed since the receipt of a voice input was started (step ST10). When the input timeout time control means 16 determines that the second timeout time T2 has elapsed since the receipt of a voice input was started, the control means 13 ends the receipt of a voice input and returns to step ST2. In contrast, when the input timeout time control means determines that the second timeout time T2 has not elapsed since the receipt of a voice input was started, the control means 13 determines whether or not the utterance is completed, and, when the utterance is not completed, returns to step ST10 and continues the process, or ends the process otherwise.

When, in step ST5, the noise level is less than the predetermined level, the input timeout time control means 16 lengthens the first through third timeout times T1 to T3 by time lengths which are defined beforehand, respectively (step ST12). When the first through third timeout times T1 to T3 are lengthened, the control means 13 turns on the autorestart of the receipt of a voice input (i.e., turns on the input restart control means 15: step ST13), and performs step ST8.

When the input restart control means 15 is turned on, the input restart control means 15 controls whether to restart the receipt of a voice input according to the noise level after a timeout occurs. That is, when the noise level is less than the predetermined level, the input restart control means 15 restarts the receipt of a voice input automatically (in other words, even though the uttering switch 14 is not pressed down).

As mentioned above, because the voice recognition apparatus according to this Embodiment 1 is constructed in such a way as to shorten the first through third timeout times T1 to T3 when the noise level is equal to or higher than the predetermined level, i.e., the ambient noise is high, as a result of the setting of the timeout times according to the noise level, the probability that noise and voice are inputted simultaneously to the voice recognition apparatus becomes low and therefore the probability resulting in erroneous recognition becomes low. As a result, there is provided an advantage of being able to always recognize an inputted voice with a high degree of precision.

As mentioned above, because the voice recognition apparatus according to this Embodiment 1 is constructed in such a way as to turn on the autorestart of the receipt of a voice input when the noise level is lower than the predetermined level, i.e., the ambient noise is low, as a result of restarting the receipt of a voice input automatically after a timeout occurs, there is provided an advantage of being able to enable the user to omit the operation of depressing down the uttering switch 14 and so on.

Embodiment 2

Figure 4:
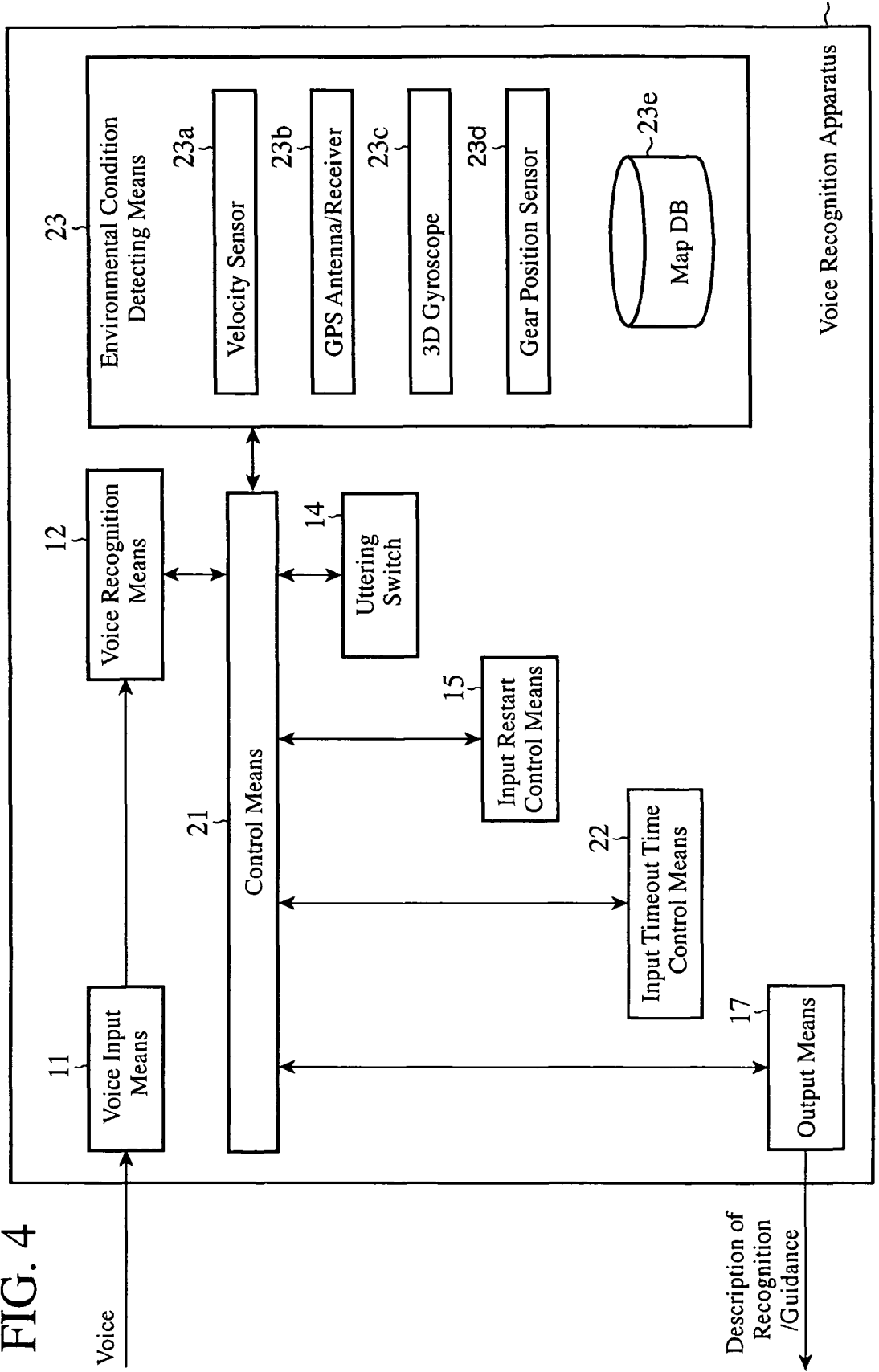
FIG. 4 is a block diagram showing an example of a voice recognition apparatus in accordance with Embodiment 2 of the present invention.

FIG. 4 is a block diagram showing an example of a voice recognition apparatus in accordance with Embodiment 2 of the present invention. In FIG. 4, the same components as those of the voice recognition apparatus shown in FIG. 1 are designated by the same reference numerals as those shown in FIG. 1. In the illustrated voice recognition apparatus 20, because the operations of a control means and an input timeout time control means are different from those of the control means 13 and the input timeout time control means 16 shown in FIG. 1, they are designated by reference numerals 21 and 22, respectively. In FIG. 4, an environmental condition detecting means 23 has a velocity sensor 23a, a GPS antenna/receiver 23b, a three-dimensional (3D) gyroscope 23c, a gear position sensor 23d, and a map database (map BD) 23e.

In FIG. 4, the velocity sensor 23a detects the velocity of a vehicle, and outputs a vehicle velocity detection signal. The GPS antenna/receiver 23b acquires a GPS signal by receiving the signal with a GPS user, and the 3D gyroscope 23c outputs a gyroscope detection signal indicating the position and the traveling direction of the vehicle. The gear position sensor 23d detects the gear position of the vehicle (i.e., the gear position of the transmission).

The environmental condition detecting means 23 acquires the current position of the vehicle with the GPS signal, and corrects the current position according to the gyroscope detection signal as needed so as to acquire the vehicle's current position. The environmental condition detecting means 23 then searches through the map DB 23e according to the vehicle's current position so as to acquire, as vehicle current position information, the type of a road along which the vehicle is traveling and the type of an area in which the vehicle is located (e.g., a type indicating whether the area is an urban area or a suburban area) from the map.

The environmental condition detecting means 23 also acquires, as traveling state information, the traveling state of the vehicle according to the vehicle velocity detection signal and the gear position detection signal. These vehicle current position information and traveling state information are then provided to the control means 21, and the input timeout time control means 22 adjusts the first through third timeout times T1 to T3 on the basis of the vehicle current position information and the traveling state information, as will be mentioned later.

Next, the operation of the voice recognition apparatus will be explained.

Figure 5:
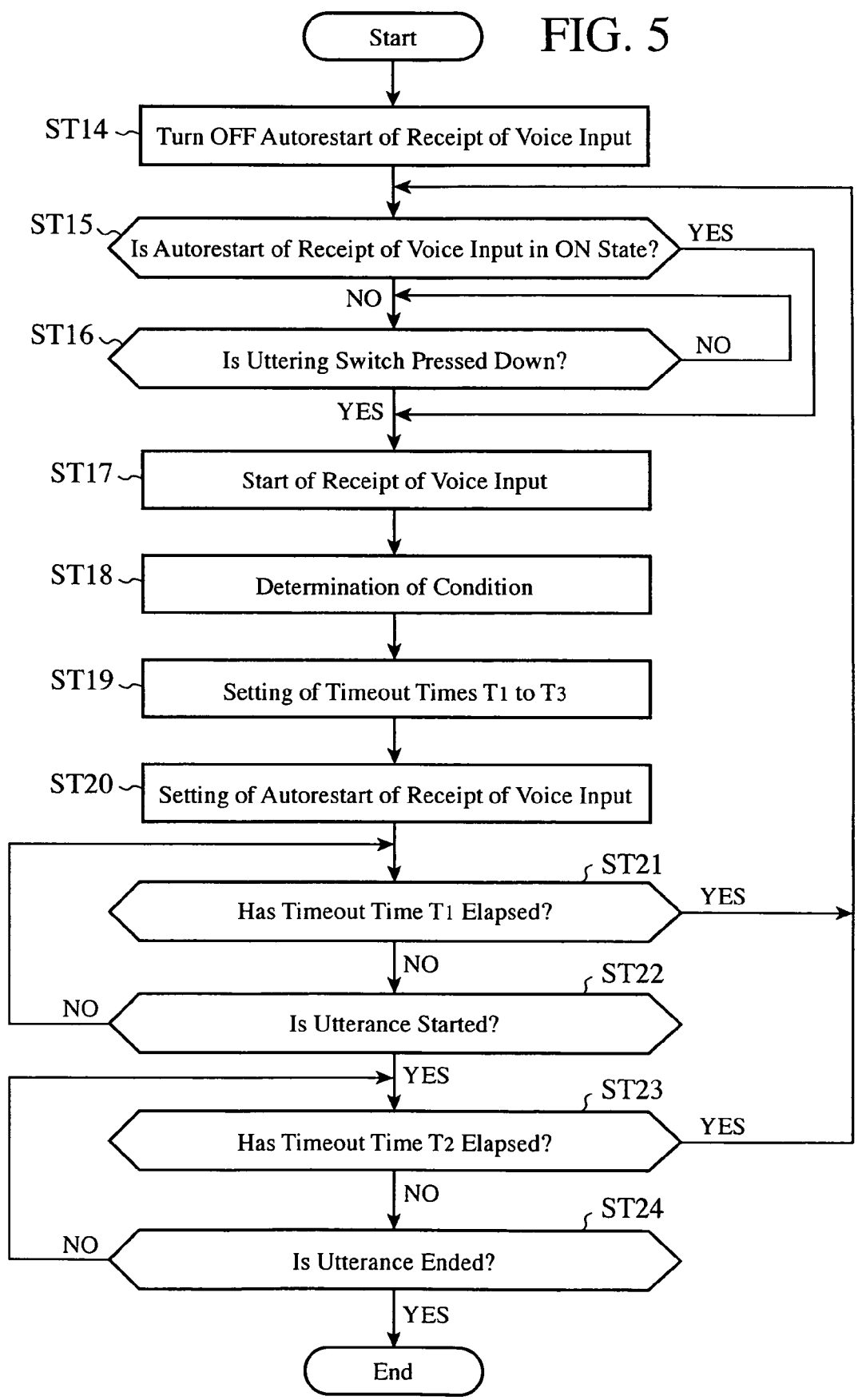
FIG. 5 is a flow chart for explaining the operation of the voice recognition apparatus shown in FIG. 4.

Referring to FIGS. 4 and 5, when the voice recognition apparatus 20 is turned on, the control means 21 places the autorestart of the receipt of a voice input in the OFF state (step ST14), and then determines whether or not the autorestart of the receipt of a voice input is placed in the ON state (step ST15). At this time, because the input restart control means 15 is placed in the OFF state, the control means 21 determines whether or not the uttering switch 14 is pressed down (step ST16), and stands by until the uttering switch 14 is pressed down. When the uttering switch 14 is pressed down, the receipt of a voice input is started by the control means 21 (step ST17).

Next, the input timeout time control means 22 makes a determination of whether or not a further condition is satisfied under the control of the control means 21 (step ST18). Referring to FIG. 6, FIG. 6 is a diagram showing an example of a decision table set to the control means 21. In the illustrated example, the decision table has a plurality of item numbers, and, as conditions corresponding to the item numbers, respectively, "whether the current location (the current position) is the one in the vicinity of the destination", "whether the velocity is lower than 60 km/h", "whether the velocity is equal to or higher than 60 km/h", "whether the road type is a minor street", "whether the area type is an residential area", and so on are set up, and the first through third timeout times (ms) are defined for each of the plurality of item numbers and "ON" or "OFF" of the autorestart (the autorestart of the voice receipt) is also defined for each of the plurality of item numbers.

The input timeout time control means 22 compares the current position and the traveling state of the vehicle which are indicated by the above-mentioned vehicle current position information and the traveling state information with the decision table and determines whether the decision table includes an item number corresponding to the current position and the traveling state of the vehicle, and, when the corresponding item number exists in the table, sets up the first through third timeout times T1 to T3 which correspond to the corresponding item number (step ST19). The input restart control means 15 further sets up the autorestart of the receipt of a voice input corresponding to the corresponding item number (step ST20).

As shown in FIG. 6, the first through third timeout times T1 to T3 and the automatic reproduction setting differ according to the condition, and the first through third timeout times T1 to T3 are set up and the ON or OFF setting of the automatic reproduction is performed on the basis of both the vehicle current position information and the traveling state information. At that time, if two or more of the conditions shown by the item numbers 1 to 99 are satisfied simultaneously, the first through third timeout times T1 to T3 and the automatic reproduction which are shown by the item number 100 are set up.

After the first through third timeout times T1 to T3 and the automatic reproduction are thus set up, the input timeout time control means 22 determines whether the first timeout time T1 has elapsed since the receipt of a voice input was started (step ST21). When the input timeout time control means 22 determines that the first timeout time T1 has elapsed since the receipt of a voice input was started, the control means 21 ends the receipt of a voice input and then returns to step ST15. In contrast, when the input timeout time control means determines that the first timeout time T1 has not elapsed since the receipt of a voice input was started, the control means 21 determines whether or not an utterance is started (step ST22), and, if no utterance is started, returns to step ST21.

When an utterance is started, the input timeout time control means 22 determines whether the second timeout time T2 has elapsed since the receipt of a voice input was started (step ST23). When the input timeout time control means 22 determines that the second timeout time T2 has elapsed since the receipt of a voice input was started, the control means 21 ends the receipt of a voice input and returns to step ST15. In contrast, when the input timeout time control means determines that the second timeout time T2 has not elapsed since the receipt of a voice input was started, the control means 21 determines whether or not the utterance is completed (step ST24), and, when the utterance is not completed, returns to step ST23 and continues the process, or ends the process otherwise.

As mentioned above, because the voice recognition apparatus according to this Embodiment 2 is constructed in such a way as to set up the first through third timeout times T1 to T3 according to the current position and the traveling state of the vehicle, the probability that noise resulting from the current position and the traveling state of the vehicle is inputted to the voice recognition apparatus together with a voice becomes low and therefore the probability resulting in erroneous recognition becomes low. As a result, there is provided an advantage of being able to always recognize an inputted voice with a high degree of precision.

As mentioned above, because the voice recognition apparatus according to this Embodiment 2 is constructed in such a way as to determine whether to perform the autorestart of the receipt of a voice input according to the current position and the traveling state of the vehicle, as a result of automatically restarting the receipt of a voice input according to the current position and the traveling state of the vehicle after a timeout occurs, there is provided an advantage of being able to enable the user to omit the operation of depressing down the uttering switch 14 and so on.

Embodiment 3

Figure 7:
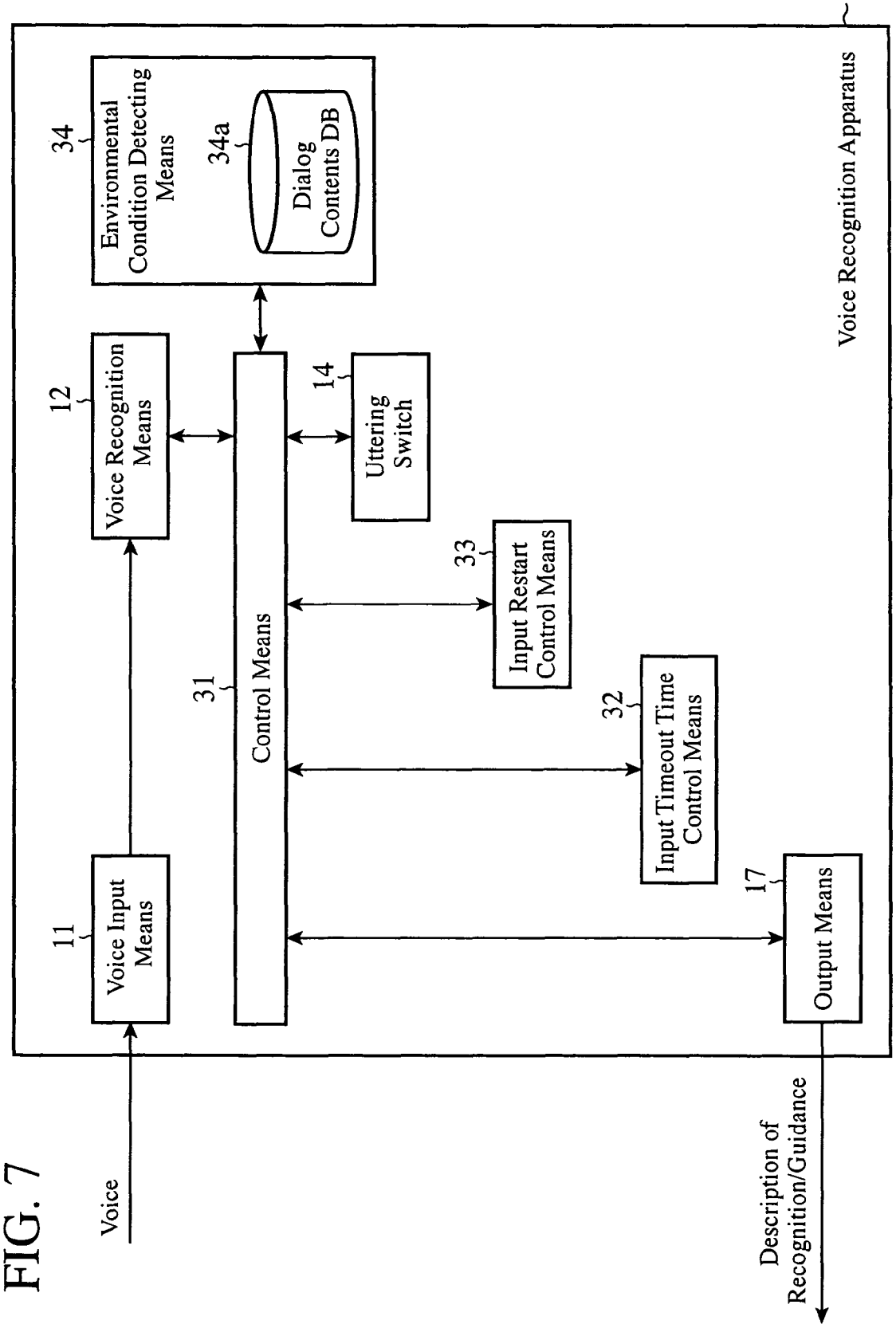
FIG. 7 is a block diagram showing an example of a voice recognition apparatus in accordance with Embodiment 3 of the present invention.

FIG. 7 is a block diagram showing an example of a voice recognition apparatus in accordance with Embodiment 3 of the present invention. In FIG. 7, the same components as those of the voice recognition apparatus shown in FIG. 1 are designated by the same reference numerals as those shown in FIG. 1. In the illustrated voice recognition apparatus 30, because the operations of a control means, an input timeout time control means, and an input restart control means are different from those of the control means 13, the input timeout time control means 16, and the input restart control means 15 shown in FIG. 1, they are designated by reference numerals 31, 32, and 33, respectively. In FIG. 7, an environmental condition detecting means 34 is provided with a dialog contents DB 34a.

Dialog contents with each of which the voice recognition apparatus 30 interacts with the user are stored in this dialog contents DB 34a, and the environmental condition detecting means 34 provides a dialog content (e.g., a question) stored in the dialog contents DB 34a to the control means 31 according to the environmental conditions of the vehicle and the control means 31 outputs this question by way of the output means 17. The input timeout time control means 32 then adjusts the first through third timeout times T1 to T3 according to a degree of difficulty in dialog, which will be mentioned later, under the control of the control means 31. Furthermore, the input restart control means 33 brings the autorestart of the receipt of an input to the ON or OFF state according to the degree of difficulty in dialog under the control of the control means 31.

Next, the operation of the voice recognition apparatus will be explained.

Figure 8:
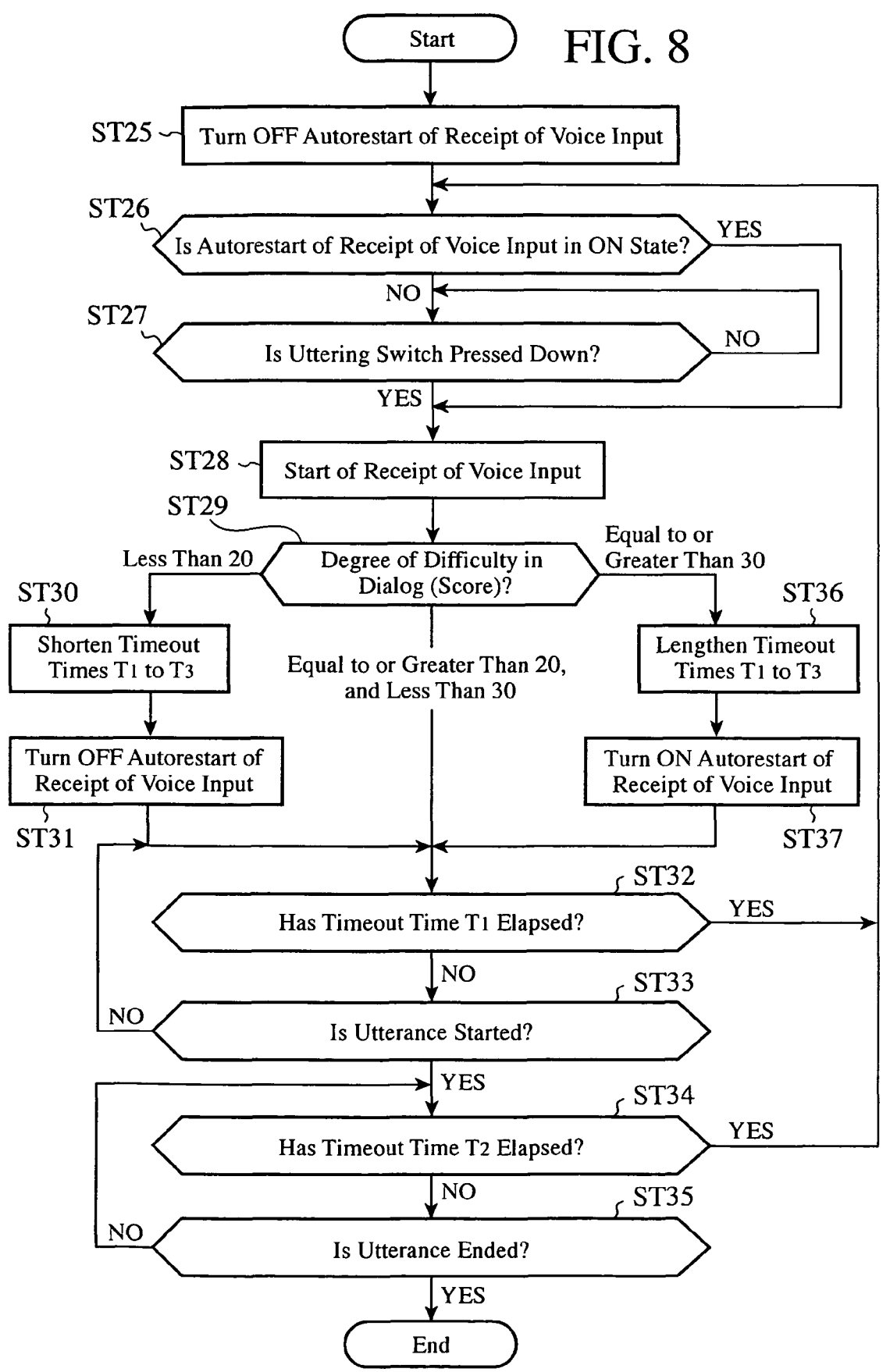
FIG. 8 is a flow chart for explaining the operation of the voice recognition apparatus shown in FIG. 7.

Referring to FIGS. 7 and 8, when the voice recognition apparatus 30 is turned on, the control means 31 places the autorestart of the receipt of a voice input in the OFF state (step ST25), and then determines whether or not the autorestart of the receipt of a voice input is placed in the ON state (step ST26). At this time, because the input restart control means 33 is placed in the OFF state, the control means 31 determines whether or not the uttering switch 14 is pressed down (step ST27), and stands by until the uttering switch 14 is pressed down. When the uttering switch 14 is pressed down, the receipt of a voice input is started by the control means 31 (step ST28).

After that, the control means 31 outputs a question stored in the dialog contents DB 34a by way of the output means 17. A degree-of-difficulty-in-dialog table as shown in, for example, FIG. 9 is stored in the dialog contents DB 34a, and in this degree-of-difficulty-in-dialog table a degree of difficulty in dialog (i.e., a score) corresponding to each dialog content (i.e., each question) is set up. The control means 31 acquires a degree of difficulty (i.e., a score) corresponding to the dialog content with reference to the degree-of-difficulty-in-dialog table, and judges the score (step ST29).

When the score is less than 20, the input timeout time control means 32 shortens the first through third timeout times T1 to T3 from first through third predetermined times by first through third time lengths which are defined in advance, respectively (step ST30). The control means 13 also holds the autorestart of the voice input receipt in the OFF state (step ST31). Next, the input timeout time control means 32 determines whether the first timeout time T1 has elapsed since the receipt of a voice input was started (step ST32).

When the input timeout time control means 32 determines that the first timeout time T1 has elapsed since the receipt of a voice input was started, the control means 31 ends the receipt of a voice input and returns to step ST26. In contrast, when the input timeout time control means determines that the first timeout time T1 has not elapsed since the receipt of a voice input was started, the control means 31 determines whether or not an utterance is started (step ST33), and, when no utterance is started, returns to step ST32.

When an utterance is started, the input timeout time control means 32 determines whether the second timeout time T2 has elapsed since the receipt of a voice input was started (step ST34). When the input timeout time control means 32 determines that the second timeout time T2 has elapsed since the receipt of a voice input was started, the control means 31 ends the receipt of a voice input and returns to step ST26. In contrast, when the input timeout time control means determines that the second timeout time T2 has not elapsed since the receipt of a voice input was started, the control means 31 determines whether or not the utterance is completed (step ST35), and, when the utterance is not completed, returns to step ST34 and continues the process, or ends the process otherwise.

When, in step ST29, the score is equal to or greater than 20 and is less than 30, the input timeout time control means 32 sets the first through third timeout times T1 to T3 to the first through third predetermined times, respectively, and then shifts to step ST32.

In contrast, when, in step ST29, the score is equal to or greater than 30, the input timeout time control means 32 lengthens the first through third timeout times T1 to T3 from the first through third predetermined times by the first through third time lengths which are defined in advance, respectively (step ST36). Furthermore, the control means 31 turns on the autorestart of the receipt of a voice input receipt (step ST37). After that, step ST32 is performed. When the input restart control means 33 is turned on, the input restart control means 33 controls whether to restart the receipt of a voice input according to the score after a timeout occurs. That is, the input restart control means 33 restarts the receipt of a voice input automatically when the score is equal to or greater than 30.

As mentioned above, because the voice recognition apparatus according to this Embodiment 3 is constructed in such a way as to lengthen the first through third timeout times T1 to T3 when the degree of difficulty of the dialog content is high, the user can utter with an enough time and the rate of acceptance of the utterance can be improved. As a result, the operating load and the mental stress on the user can be reduced.

Because the voice recognition apparatus according to this Embodiment 3 is constructed in such a way as to turn on the autorestart of the receipt of a voice input according to the degree of difficulty of the dialog content, as a result of restarting the receipt of a voice input automatically after a timeout occurs, there is provided an advantage of being enable the user to omit the operation of depressing down the uttering switch 14 and so on.

INDUSTRIAL APPLICABILITY

As mentioned above, the voice recognition apparatus in accordance with the present invention is suitable for provision of a voice recognition apparatus which can recognize an inputted voice with a high degree of precision.

The invention claimed is:

1. A voice recognition apparatus comprising:
a voice recognition unit that perfoms voice recognition;
a control unit that controls receipt of a voice input to said voice recognition unit according to a timeout time which defines an end of the receipt of a voice input, and for performing recognition according to a result of the voice recognition acquired by said voice recognition unit;
an environmental condition detecting unit that detects an environmental condition;
a timeout time control unit that changes said timeout time according to the environmental condition detected by said environmental condition detection unit; and
a receipt restart control unit that determines whether to restart the receipt of a voice input according to the environmental condition detected by the environmental condition detection unit after said receipt of a voice input times out.

2. The voice recognition apparatus according to claim 1, wherein the timeout time includes a first timeout time which defines a time interval from a start of the receipt of a voice to a start of utterance, and a second timeout time which defines a time interval from said start of the receipt of a voice to an end of the utterance, and a third timeout time which defines a time interval succeeding said end of the utterance.

3. The voice recognition apparatus according to claim 1, wherein the environmental condition detecting unit detects, as said environmental condition, a noise level in a surrounding environment, the timeout control unit reduces the timeout time when said noise level is equal to or higher than a predetermined level, and the restart control unit grants the restart of the receipt of a voice input when said noise level is lower than the predetermined level.

4. The voice recognition apparatus according to claim 1, wherein the environmental condition detecting unit detects, as the environmental condition, at least one of current position information indicating a current position of a moving object and traveling state information indicating a traveling state of the moving object, the timeout control unit compares a preset criterion with said environmental condition and changes the timeout time, and the restart control unit compares said criterion with said environmental condition and determines whether to grant the restart of the receipt of a voice input.

5. The voice recognition apparatus according to claim 4, wherein the current position information indicates the current position of the moving object, and includes a type of a road along which said moving object is traveling and a type of an area in which said moving object is traveling.

6. The voice recognition apparatus according to claim 4, wherein at least a traveling velocity of the moving object and a gear position in a transmission of the moving object are included in the traveling state information.

7. The voice recognition apparatus according to claim 1, wherein the environmental condition detecting unit has a degree-of-difficulty-in-dialog table in which dialog contents and degrees of difficulty which are defined for the dialog contents respectively are included, said environmental condition detecting unit acquires a degree of difficulty corresponding to said dialog content on a basis of said degree-of-difficulty-in-dialog table, the timeout control unit changes the timeout time according to the degree of difficulty acquired by said environmental condition detecting unit, and the restart control unit determines whether to grant the restart of the receipt of a voice input according to said degree of difficulty.

8. A voice recognition method comprising:
performing voice recognition;
controlling receipt of a voice input according to a timeout time which defines an end of the receipt of a voice input, and for performing recognition according to a result of the voice recognition acquired by said performing voice recognition step;
detecting, by utilizing an environmental condition detecting unit, an environmental condition;
changing said timeout time according to the environmental condition; and
determining whether to restart the receipt of a voice input according to the environmental condition detected by the environmental condition detecting step after said receipt of a voice input times out.

9. The voice recognition method according to claim 8, wherein the timeout time includes a first timeout time which defines a time interval from a start of the receipt of a voice to a start of utterance, and a second timeout time which defines a time interval from said start of the receipt of a voice to an end of the utterance, and a third timeout time which defines a time interval succeeding said end of the utterance.

10. The voice recognition method according to claim 8, further comprising:
detecting, as said environmental condition, a noise level in a surrounding environment;
reducing the timeout time when said noise level is equal to or higher than a predetermined level; and granting the restart of the receipt of a voice input when said noise level is lower than the predetermined level.

11. The voice recognition method according to claim 8, further comprising:
   detecting, as the environmental condition, at least one of current position information indicating a current position of a moving object and traveling state information indicating a traveling state of the moving object;
   comparing a preset criterion with said environmental condition and changing the timeout time;
   comparing said criterion with said environmental condition; and
   determining whether to grant the restart of the receipt of a voice input.

12. The voice recognition method according to claim 11, wherein the current position information indicates the current position of the moving object, and includes a type of a road along which said moving object is traveling and a type of an area in which said moving object is traveling.

13. The voice recognition method according to claim 11, wherein at least a traveling velocity of the moving object and a gear position in a transmission of the moving object are included in the traveling state information.

14. The voice recognition method according to claim 8, wherein the environmental condition detecting unit has a degree-of-difficulty-in-dialog table in which dialog contents and degrees of difficulty which are defined for the dialog contents respectively are included, said method further comprising:
   acquiring a degree of difficulty corresponding to said dialog content on a basis of said degree-of-difficulty-in-dialog table;
   changing the timeout time according to the degree of difficulty acquired by said acquiring step; and
   determining whether to grant the restart of the receipt of a voice input according to said degree of difficulty.

* * * * *